US011411990B2

United States Patent
Pandey et al.

(10) Patent No.: US 11,411,990 B2
(45) Date of Patent: Aug. 9, 2022

(54) EARLY DETECTION OF POTENTIALLY-COMPROMISED EMAIL ACCOUNTS

(71) Applicant: Forcepoint LLC, Austin, TX (US)

(72) Inventors: Ruchika Pandey, Del Mar, CA (US); Ran Mosessco, Escondido, CA (US)

(73) Assignee: Forcepoint LLC, Austin, TX (US)

( * ) Notice: Subject to any disclaimer, the term of this patent is extended or adjusted under 35 U.S.C. 154(b) by 321 days.

(21) Appl. No.: 16/277,468

(22) Filed: Feb. 15, 2019

(65) Prior Publication Data

US 2020/0267181 A1 Aug. 20, 2020

(51) Int. Cl.
H04L 9/40 (2022.01)

(52) U.S. Cl.
CPC ...... H04L 63/1483 (2013.01); H04L 63/1425 (2013.01); H04L 63/1466 (2013.01)

(58) Field of Classification Search
CPC . H04L 63/14; H04L 63/1408; H04L 63/1416; H04L 63/1425; H04L 63/1441; H04L 63/1466; H04L 63/1483; H04L 2463/144
See application file for complete search history.

(56) References Cited

U.S. PATENT DOCUMENTS

| | | | | |
|---|---|---|---|---|
| 6,321,267 B1 * | 11/2001 | Donaldson | ............ | H04L 63/145 709/227 |
| 7,953,814 B1 * | 5/2011 | Chasin | .................. | H04L 63/145 709/207 |
| 8,280,968 B1 * | 10/2012 | Duan | .................. | H04L 63/0245 709/206 |
| 8,291,024 B1 * | 10/2012 | Cheng | ..................... | H04L 51/12 709/206 |
| 8,396,927 B2 * | 3/2013 | Cai | ......................... | H04L 51/12 709/206 |
| 8,424,091 B1 * | 4/2013 | Su | .......................... | H04L 51/12 726/24 |

(Continued)

OTHER PUBLICATIONS

Shafer, Carlo, Detection of Compromised Email Accounts used for Spamming in Correlation with Mail User Agent Access Activities Extracted from Metadata; 2017 5th International Symposium on Digital Forensic and Security (ISDFS), Apr. 26-28, 2017, IEEE Xplore May 4, 2017.

(Continued)

*Primary Examiner* — Khang Do
(74) *Attorney, Agent, or Firm* — Jackson Walker L.L.P.

(57) ABSTRACT

A method, system, and computer-usable medium are disclosed for establishing a reference outbound email volume rate for a user account, monitoring the user account to determine a current outbound email volume rate, determining a risk score based on the current outbound email volume rate and the reference outbound email volume rate, buffering outgoing emails of the user account if the risk score exceeds a threshold risk score, analyzing the buffered emails against one or more factors indicative of a probability of the buffered emails comprising spam, and responsive to analysis of the buffered emails against the one or more factors indicating that the user account is potentially compromised, quarantine the user account and prevent outbound mail from being delivered from the user account.

16 Claims, 3 Drawing Sheets

(56) References Cited

U.S. PATENT DOCUMENTS

| | | | |
|---|---|---|---|
| 8,533,270 B2* | 9/2013 | Starbuck | G06Q 10/107 709/206 |
| 8,566,938 B1* | 10/2013 | Prakash | H04L 51/12 726/22 |
| 8,626,861 B1* | 1/2014 | Duan | H04L 69/329 709/206 |
| 8,819,142 B1* | 8/2014 | Golub | H04L 51/12 709/206 |
| 9,015,192 B1* | 4/2015 | Nachum | G06F 16/245 707/769 |
| 9,210,111 B2* | 12/2015 | Chasin | H04L 51/12 |
| 9,473,439 B2* | 10/2016 | Kay | H04L 51/26 |
| 9,519,682 B1* | 12/2016 | Pujara | H04H 20/28 |
| 9,596,202 B1* | 3/2017 | Beach | H04L 51/12 |
| 10,009,358 B1* | 6/2018 | Xie | G06F 21/552 |
| 10,044,715 B2* | 8/2018 | Black | H04L 63/107 |
| 10,110,616 B1* | 10/2018 | Xie | H04L 63/1425 |
| 10,523,609 B1* | 12/2019 | Subramanian | H04L 63/1416 |
| 10,666,676 B1* | 5/2020 | Hsu | H04L 51/12 |
| 10,834,127 B1* | 11/2020 | Yeh | H04L 51/12 |
| 10,880,322 B1* | 12/2020 | Jakobsson | H04L 63/1416 |
| 11,044,267 B2* | 6/2021 | Jakobsson | H04L 63/123 |
| 11,102,244 B1* | 8/2021 | Jakobsson | H04L 51/02 |
| 2004/0177271 A1* | 9/2004 | Arnold | G06Q 10/107 713/154 |
| 2005/0021649 A1* | 1/2005 | Goodman | G06F 21/552 709/207 |
| 2006/0075048 A1* | 4/2006 | Gruper | H04L 51/12 709/206 |
| 2006/0168031 A1* | 7/2006 | Cai | H04L 51/12 709/206 |
| 2006/0288076 A1* | 12/2006 | Cowings | H04L 51/28 709/206 |
| 2007/0079379 A1* | 4/2007 | Sprosts | H04L 51/34 726/24 |
| 2007/0118759 A1* | 5/2007 | Sheppard | H04L 63/145 713/188 |
| 2007/0244974 A1* | 10/2007 | Chasin | G06Q 10/107 709/206 |
| 2008/0037583 A1* | 2/2008 | Dawes | G06Q 10/06 370/467 |
| 2008/0222425 A1* | 9/2008 | Buss | G06Q 10/10 713/185 |
| 2010/0077043 A1* | 3/2010 | Ramarao | H04L 51/12 709/206 |
| 2010/0162396 A1* | 6/2010 | Liu | H04L 63/1425 726/23 |
| 2011/0296003 A1* | 12/2011 | McCann | H04L 63/1416 709/224 |
| 2011/0296524 A1* | 12/2011 | Hines | G06F 21/552 726/22 |
| 2012/0278887 A1* | 11/2012 | Vitaldevara | H04L 63/1441 726/23 |
| 2012/0297484 A1* | 11/2012 | Srivastava | G06F 21/552 726/23 |
| 2013/0041955 A1* | 2/2013 | Chasin | H04L 63/1425 709/206 |
| 2013/0060863 A1* | 3/2013 | D'Eri | G06Q 10/107 709/206 |
| 2013/0117809 A1* | 5/2013 | McDougal | H04L 63/1408 726/1 |
| 2014/0040170 A1* | 2/2014 | Zheng | H04L 63/1408 706/12 |
| 2014/0137188 A1* | 5/2014 | Bartholomay | H04L 65/40 726/3 |
| 2014/0337452 A1* | 11/2014 | Kay | H04L 51/22 709/206 |
| 2015/0026786 A1* | 1/2015 | Alexander | H04W 12/128 726/7 |
| 2015/0067069 A1* | 3/2015 | Gourevitch | H04L 51/26 709/206 |
| 2015/0095984 A1* | 4/2015 | Adsule | H04L 63/10 726/4 |
| 2015/0100896 A1* | 4/2015 | Shmarovoz | H04L 51/12 715/752 |
| 2015/0156183 A1* | 6/2015 | Beyer | H04L 63/08 726/4 |
| 2015/0186494 A1* | 7/2015 | Gilad | G06F 16/38 707/740 |
| 2015/0339477 A1* | 11/2015 | Abrams | G06F 21/554 726/23 |
| 2016/0156654 A1* | 6/2016 | Chasin | H04L 63/1425 726/23 |
| 2016/0373466 A1* | 12/2016 | D'Aveta | G06F 21/554 |
| 2017/0230323 A1* | 8/2017 | Jakobsson | H04L 63/1433 |
| 2017/0244736 A1* | 8/2017 | Benishti | H04L 63/1483 |
| 2018/0091453 A1* | 3/2018 | Jakobsson | H04L 51/12 |
| 2018/0152471 A1* | 5/2018 | Jakobsson | H04L 63/1433 |
| 2018/0367488 A1* | 12/2018 | Chasse | H04L 51/12 |
| 2019/0166128 A1* | 5/2019 | Kurian | H04L 63/12 |
| 2019/0199745 A1* | 6/2019 | Jakobsson | H04L 51/12 |
| 2019/0379660 A1* | 12/2019 | Thirumavalavan | H04W 12/084 |
| 2020/0053111 A1* | 2/2020 | Jakobsson | H04L 51/12 |

OTHER PUBLICATIONS

Shafer, Carlo, Detection of Compromised Email Accounts used for Spamming in Correlation with Origin-Destination Delivery Notification Extracted from Metadata; 2015 IEEE Symposium on Computational Intelligence for Security and Defense Applications (CISDA), May 26-28, 2015, IEEE Xplore Aug. 20, 2015.

Karimi et al., "End-toEnd Compromised Account Detection," 2018 IEEE/ACM International Conference on Advances in Social Networks Analysis and Mining (ASONAM).

Hershkop, Shlomo, "Behavior-based Email Analysis with Application to Spam Detection," 2006.

Luo et al., "An Effective Anomaly Detection Method in SMTP Traffic," International Journal of Network Security, vol. 3, No. 3, pp. 321-330, May 2008.

* cited by examiner

EARLY DETECTION OF POTENTIALLY-COMPROMISED EMAIL ACCOUNTS

FIELD OF DISCLOSURE

The present invention relates in general to the field of computers and similar technologies, and in particular to software utilized in this field. Still more particularly, it relates to a method, system, and computer-usable medium for early detection of potentially-compromised email accounts.

BACKGROUND

While network communication among networked computers, including the use of the Internet, has many advantages, one downside to network communication is that it may render networked computers susceptible to malicious attacks from viruses or other intrusions. One particular type of intrusion may include compromised user accounts within an organization sending bulk spam email messages.

Unlike inbound email in which a sender could be any number of individuals, outbound mail is supposedly sent by a user who owns the mailbox and thus the probability of spam sent from an account without the user's knowledge is typically very low. As a result, marking outbound email as spam may require a higher degree of confidence than is required in the case of inbound emails. Outbound spam may be a strong indicator of a compromised user account and other potential risks. For example, an organization identified as sending large levels of spam messages may be blacklisted from Internet sites. Accordingly, it is desirable to detect a potentially-compromised account in a fast manner, before a high volume of emails has been sent from the potentially-compromised account.

SUMMARY

In accordance with the teachings of the present disclosure, certain disadvantages and problems associated with existing approaches to network and data security have been reduced or eliminated.

In accordance with embodiments of the present disclosure, a computer-implementable method for managing network communication may include establishing a reference outbound email volume rate for a user account, monitoring the user account to determine a current outbound email volume rate, determining a risk score based on the current outbound email volume rate and the reference outbound email volume rate, buffering outgoing emails of the user account if the risk score exceeds a threshold risk score, analyzing the buffered emails against one or more factors indicative of a probability of the buffered emails comprising spam, and responsive to analysis of the buffered emails against the one or more factors indicating that the user account is potentially compromised, quarantine the user account and prevent outbound mail from being delivered from the user account.

In accordance with these and other embodiments of the present disclosure, a system may include a processor, a data bus coupled to the processor, and a non-transitory, computer-readable storage medium embodying computer program code, the non-transitory, computer-readable storage medium being coupled to the data bus, the computer program code interacting with a plurality of computer operations and comprising instructions executable by the processor. The instructions may be configured for establishing a reference outbound email volume rate for a user account, monitoring the user account to determine a current outbound email volume rate, determining a risk score based on the current outbound email volume rate and the reference outbound email volume rate, buffering outgoing emails of the user account if the risk score exceeds a threshold risk score, analyzing the buffered emails against one or more factors indicative of a probability of the buffered emails comprising spam, and responsive to analysis of the buffered emails against the one or more factors indicating that the user account is potentially compromised, quarantine the user account and prevent outbound mail from being delivered from the user account.

In accordance with these and other embodiments of the present disclosure, a non-transitory, computer-readable storage medium may embody computer program code, the computer program code comprising computer executable instructions configured for establishing a reference outbound email volume rate for a user account, monitoring the user account to determine a current outbound email volume rate, determining a risk score based on the current outbound email volume rate and the reference outbound email volume rate, buffering outgoing emails of the user account if the risk score exceeds a threshold risk score, analyzing the buffered emails against one or more factors indicative of a probability of the buffered emails comprising spam, and responsive to analysis of the buffered emails against the one or more factors indicating that the user account is potentially compromised, quarantine the user account and prevent outbound mail from being delivered from the user account.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are explanatory examples and are not restrictive of the claims set forth in this disclosure.

BRIEF DESCRIPTION OF THE DRAWINGS

A more complete understanding of the example, present embodiments and certain advantages thereof may be acquired by referring to the following description taken in conjunction with the accompanying drawings, in which like reference numbers indicate like features, and wherein.

DETAILED DESCRIPTION

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more wired or wireless interfaces for communicating with other networked devices, external devices, and various input and output (I/O) devices, such as a keyboard, a mouse, a microphone, speakers, a track pad, a touchscreen and a display device (including a touch sensitive display device). The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

Figure 1:
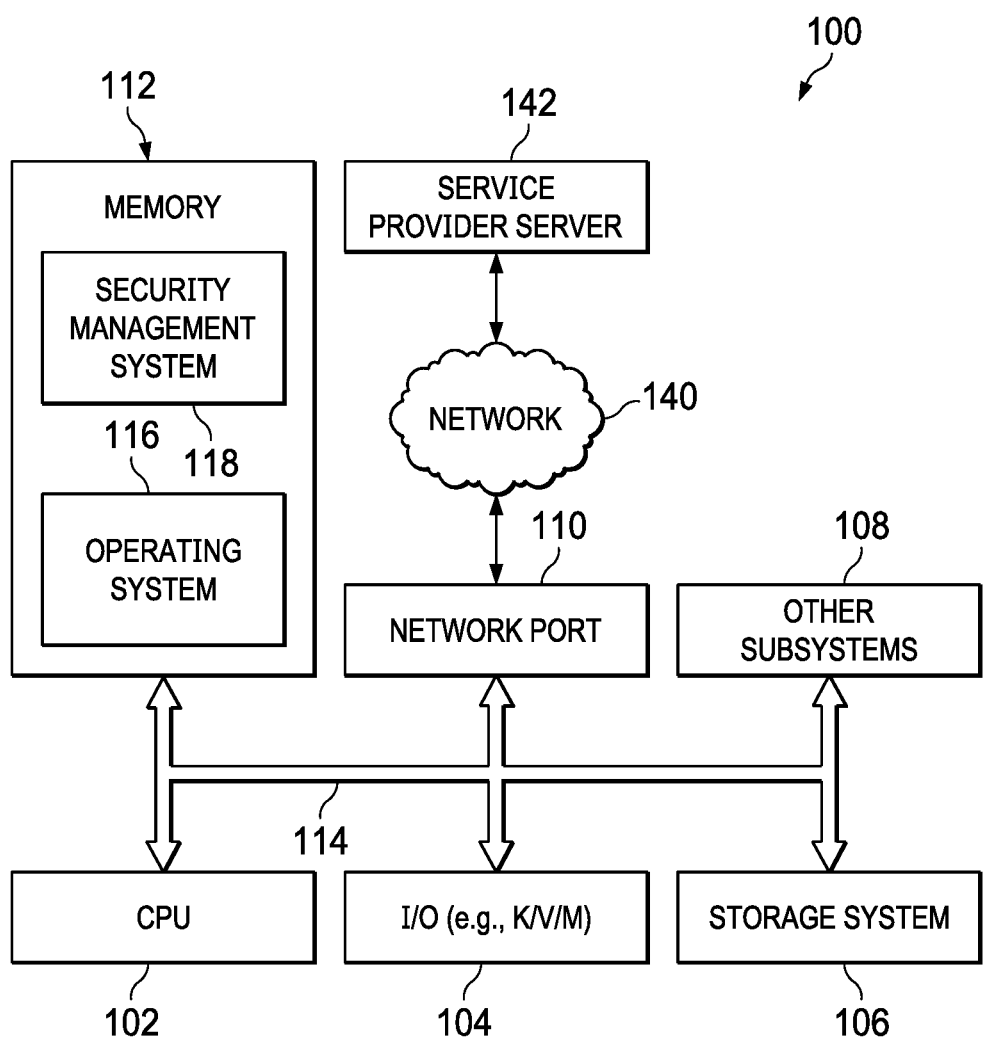
FIG. 1 illustrates an example information handling system in which the methods and systems disclosed herein may be implemented, in accordance with embodiments of the present disclosure.

FIG. 1 illustrates an example information handling system 100 in which the methods and systems disclosed herein may be implemented, in accordance with embodiments of the present disclosure. Information handling system 100 may include a processor (e.g., central processor unit or "CPU") 102, input/output (I/O) devices 104 (e.g., a display, a keyboard, a mouse, and/or associated controllers), a storage system 106, and various other subsystems 108. In various embodiments, information handling system 100 may also include network port 110 operable to couple to a network 140, which may likewise be accessible by a service provider server 142. Information handling system 100 may also include system memory 112, which may be coupled to the foregoing via one or more buses 114. System memory 112 may store operating system (OS) 116 and in various embodiments may also include a security management system 118. In some embodiments, information handling system 100 may be able to download security management system 118 from service provider server 142. In other embodiments, security management system 118 may be provided as a service from the service provider server 142.

In various embodiments, security management system 118 may (as described in greater detail below) be configured to perform early detection of potentially-compromised email accounts by classification of a user's outbound email behavior and detecting anomalies in such behavior. In some embodiments, security management system 118 and the functionality thereof may improve processor efficiency, and thus the efficiency of information handling system 100, by performing network security operations with greater efficiency and with decreased processing resources as compared to existing approaches for similar network security operations. In these and other embodiments, security management system 118 and the functionality thereof may improve effectiveness in ensuring network security, and thus the effectiveness of information handling system 100, by performing network security operations with greater effectiveness as compared to existing approaches for similar network security operations. As will be appreciated, once information handling system 100 is configured to perform the functionality of security management system 118, information handling system 100 becomes a specialized computing device specifically configured to perform the functionality of security management system 118, and is not a general purpose computing device. Moreover, the implementation of functionality of security management system 118 on information handling system 100 improves the functionality of information handling system 100 and provides a useful and concrete result of improving network security and performing network security operations with greater efficiency and with decreased processing resources by enabling early detection of potentially-compromised email accounts as described herein.

Figure 2:
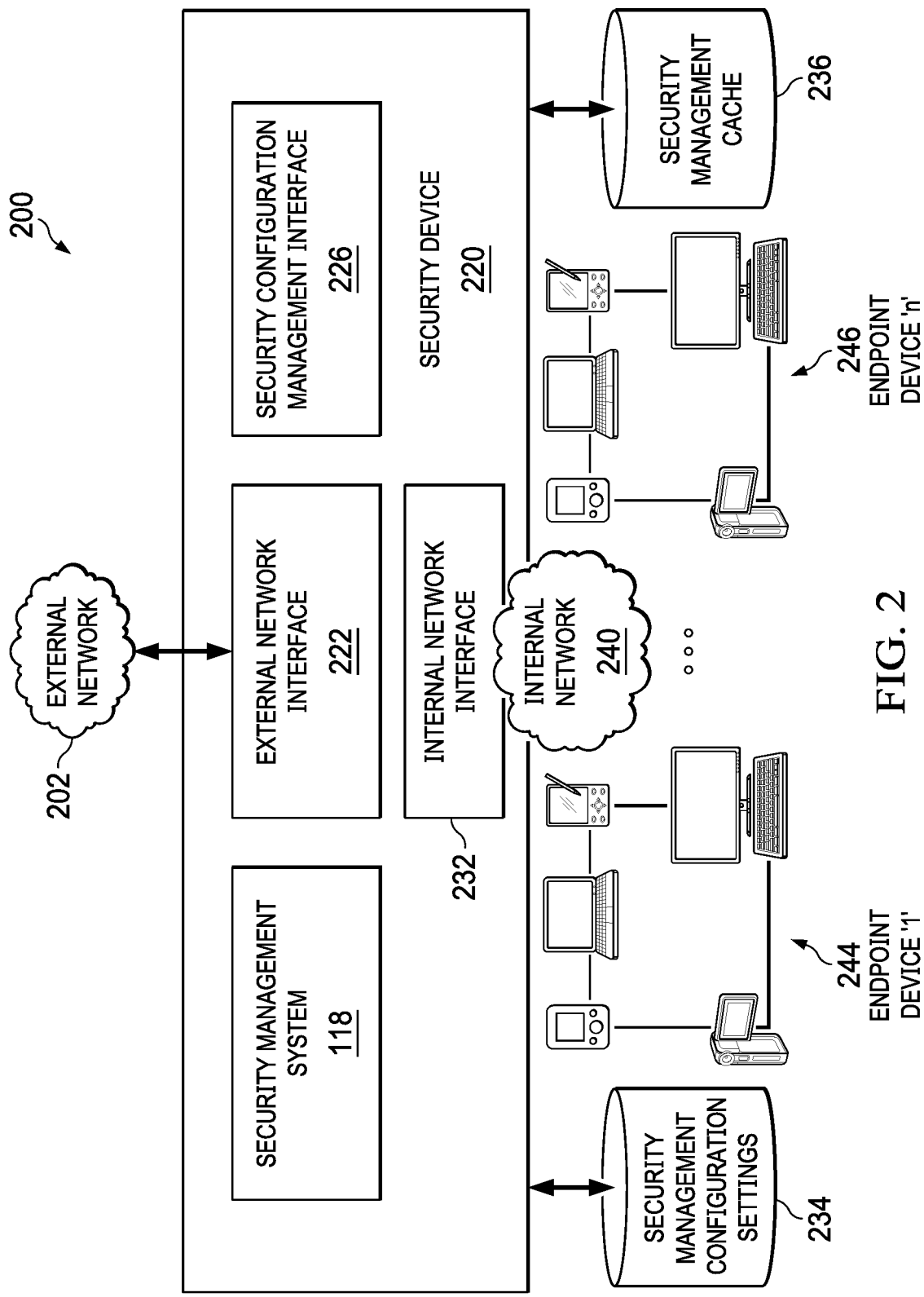
FIG. 2 illustrates a block diagram of a system for early detection of potentially-compromised email accounts, in accordance with embodiments of the present disclosure.

FIG. 2 illustrates a block diagram of a system 200 for early detection of potentially-compromised email accounts, in accordance with embodiments of the present disclosure. In some embodiments, a security device 220 may include an external network interface 222 interfaced to external network 202, a security configuration management interface 226, an internal network interface 232, and a security management system 118. Security device 220 may be implemented using any suitable information handling system 100, including without limitation a web proxy, a gateway, a firewall, an intrusion prevention system, an intrusion detection system, or any other suitable security device capable of implementing security management system 118. In some embodiments, security device 220 may be implemented as an individual security device 220, a virtual context security device 220, or a security device 220 cluster.

Security device 220 may also include in some embodiments a repository of security management configuration settings 234 and a security management cache 236. In certain embodiments, security configuration management interface 226 may be implemented to receive instructions relating to network security policy decisions from security management system 118.

Skilled practitioners of the art will be familiar with network communication involving communicating Internet Protocol (IP) datagrams, or packets, to a target group of recipient network addresses in real-time or near real-time. In some embodiments, the target group recipient network addresses may be respectively associated with a corresponding endpoint device '1' 244 through 'n' 246. As used herein, an endpoint device refers to an information processing system such as a personal computer, a laptop computer, a tablet computer, a smart phone, a mobile telephone, a digital camera, a video camera, or other device capable of storing, processing and communicating data via a network, such as an internal network 240 interfaced to internal network interface 232. In various embodiments, the communication of the data may take place in real-time or near-real-time.

Embodiments of the invention may reflect an appreciation that network communication may represent an efficient means for communicating useful information. However, those of skill in the art will likewise appreciate that it may be desirable to secure such network communication to prevent malicious attacks on network components. Many existing solutions for providing security in a network environment have disadvantages, as described in the Background section of this application. However, security management system 118 as disclosed herein may overcome these disadvantages by enabling early detection of potentially-compromised email accounts, as described herein. For example, security management system 118 may identify certain patterns and typical behaviors in a user's email sending habits. For instance, security management system 118 may analyze patterns in a user's outbound email usage based on a variety of features and use anomalies in or deviations from those patterns to identify potential outbound spam, and to use such analysis to determine a probability of an email account having been compromised. Security management system 118 may perform such analysis at a user-based level (i.e., rather than an aggregate organizational level), thus enabling discovery of user-level anomalies that break from the typical use of a single user that are not easy to detect when looking across an entire organization.

Figure 3:
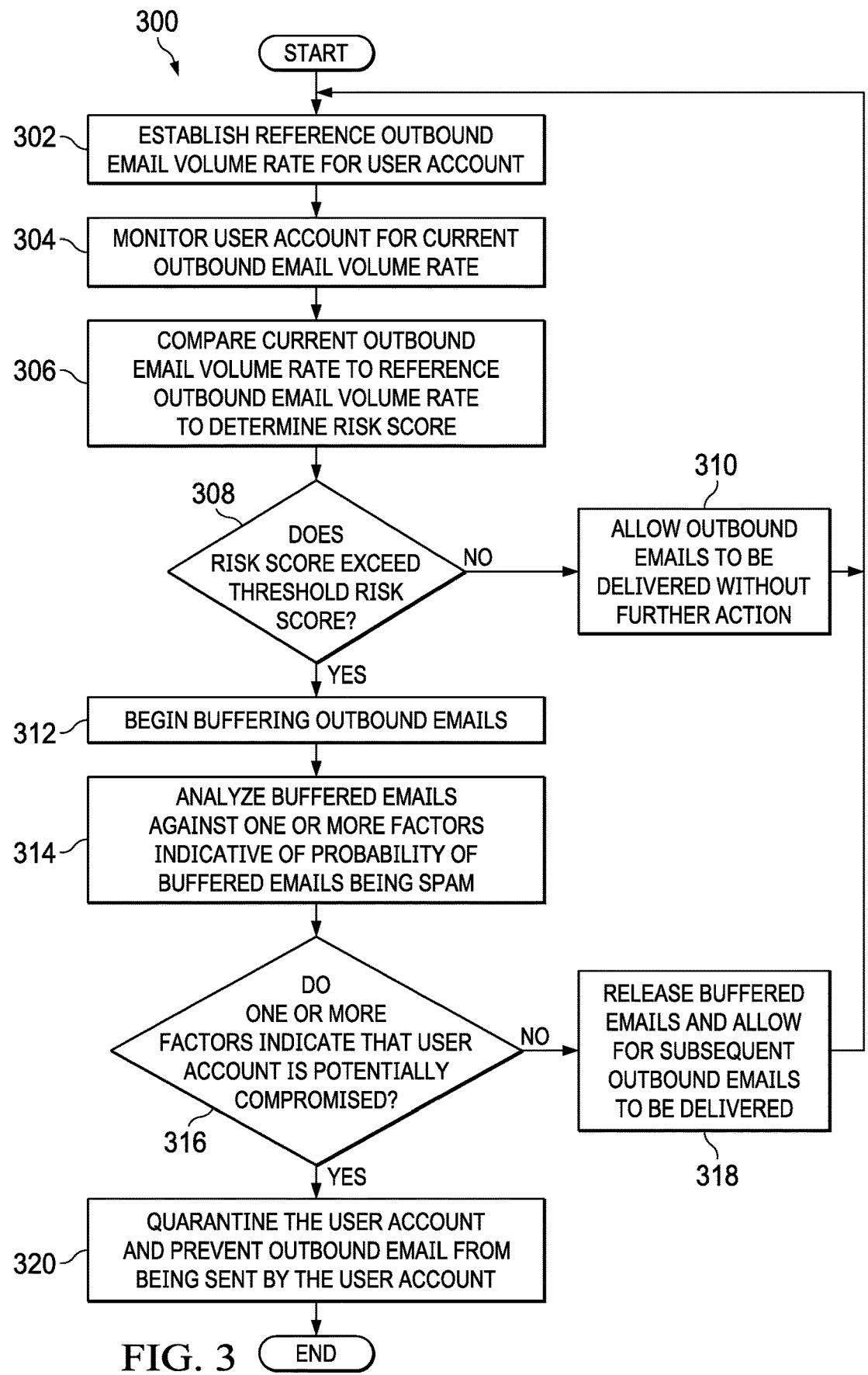
FIG. 3 illustrates a flow chart of an example method for early detection of potentially-compromised email accounts, in accordance with embodiments of the present disclosure.

FIG. 3 illustrates a flow chart of an example method 300 for performing early detection of potentially-compromised email accounts, in accordance with embodiments of the present disclosure. According to some embodiments, method 300 may begin at step 302. As noted above, teachings of the present disclosure may be implemented in a variety of configurations of information handling system 100. As such, the preferred initialization point for method 300 and the order of the steps comprising method 300 may depend on the implementation chosen.

The various steps described below may be performed by security management system 118 on each particular user account of interest in an organization (which could include all user accounts in an organization).

At step 302, security management system 118 may establish a reference outbound email volume rate for a user account. Security management system 118 may establish the reference outbound email volume rate in any suitable manner that is representative of a user account's typical volume per unit time of outbound email. For example, in some embodiments, such reference outbound email volume rate may be defined by a daily mean of the number of recipients of outbound email messages from the user account averaged over a given rolling number of days (e.g., 30 days).

At step 304, security management system 118 may monitor the user account for a current outbound email volume rate. Such current outbound email volume rate may be representative of a recent (e.g., substantially real-time) measure of the user account's volume of email sent per unit time. For example, in some embodiments, such current outbound email volume rate may be defined by mean of the number of recipients of outbound email messages from the user account averaged over a given rolling number of minutes (e.g., five minutes).

At step 306, security management system 118 may compare the current outbound email volume rate for the user account versus the reference outbound email volume rate for the user account and determine a risk score based on the comparison, wherein the risk score may increase as the current outbound email volume rate increases relative to the reference outbound email volume rate, and the risk score may decrease as the current outbound email volume rate decreases relative to the reference outbound email volume rate. For example, a high risk score may be assigned to the user account if the current outbound email volume rate is 20 standard deviations or more from the reference outbound email volume rate. As another example, a more granular approach may involve assigning a particular risk score to a current outbound email volume rate that is 10 standard deviations from the reference outbound email volume rate, while assigning a higher risk score to a current outbound email volume rate that is 20 standard deviations from the reference outbound email volume rate, and so on.

At step 308, security management system 118 may compare the risk score for the user account to a threshold risk score. If the risk score exceeds the threshold risk score, method 300 may proceed to step 312. Otherwise, method 300 may proceed to step 310.

At step 310, responsive to the risk score for the user account being below the threshold risk score, security management system 118 may allow for outbound emails of the user account to be delivered without action on the part of security management system 118. After completion of step 310, method 300 may proceed again to step 302.

At step 312, responsive to the risk score for the user account exceeding the threshold risk score, security management system 118 may begin buffering outbound emails of the user account before sending.

At step 314, security management system 118 may perform collection and analysis of the buffered emails for an additional period of time to determine if the user account's outbound emails exhibit other indicia of spam. Such analysis may include analyzing the buffered emails to see if the buffered emails have one or more properties indicative of spam. For example, one such analysis may include determining a number of unique domains to which the buffered emails are addressed. A higher number of domains may indicate a higher probability that the buffered emails are spam. As another example, another such analysis may include the alphabetization of destination addresses for the buffered email, as if the buffered email is intended for an alphabetical list of addresses, such characteristic may also be indicative of a likelihood of spam. As a further example, another such analysis may be an analysis of the user's habits related to an email client application used by the user of the user account and whether such use is atypical of the user's normal usage patterns.

As an additional example, another analysis may be a determination of a percentage of recipient email addresses which are "freemail" accounts given to users for free. In an organizational setting, it is often rare that customers, clients, suppliers, or other partners of an organization would send a large volume of email to freemail accounts. On the one hand, there may be many legitimate cases within an organization for sending email to a large number of freemail addresses, especially for organizations that deal directly with consumers. However, such communications are typically carried out by a small number of designated email accounts that interact with external entities on a regular basis which would be part of their regular use and not an anomaly. Accordingly, a comparison of a user's typical use of the user account to send email to freemail accounts to a current use of the user account to send email to freemail may be used to indicate a likelihood of spam.

As yet another example, another analysis may be an analysis of the length of a subject line of an email. Spam typically has shorter subject lines (e.g., six words or less) than legitimate email.

Thus, in step 314, security management system 118 may use one or more of these factors (or any other suitable factors) to analyze the buffered email to quickly identify whether the user account is potentially compromised. At step 316, security management system 118 may determine if these one or more factors indicate that the user account is potentially compromised. If the user account is potentially compromised, method 300 may proceed to step 320. Otherwise, method 300 may proceed to step 318.

At step 318, responsive to security management system 118 determining the user account to not be potentially compromised, security management system 118 may release the buffered emails and allow for subsequent outbound emails to be delivered. After completion of step 318, method 300 may proceed again to step 302.

At step 320, responsive to security management system 118 determining the user account to be potentially compromised, security management system 118 may quarantine the user account and prevent outbound email from being sent by the user account until it can be determined (e.g., by security management system 118 or an administrator of the organization) that the user account is no longer compromised. After completion of step 320, method 300 may end.

Although FIG. 3 discloses a particular number of steps to be taken with respect to method 300, method 300 may be executed with greater or fewer steps than those depicted in FIG. 3. In addition, although FIG. 3 discloses a certain order of steps to be taken with respect to method 300, the steps comprising method 300 may be completed in any suitable order.

Method 300 may be implemented using CPU 102, security management system 118 executing thereon, and/or any other system operable to implement method 300. In certain embodiments, method 300 may be implemented partially or fully in software and/or firmware embodied in computer-readable media.

In some embodiments, a threshold risk score may be adaptively modified over time. Additional improvements to the approaches outlined above may also include using machine learning for data clustering and anomaly detection instead of statistical analysis, using the same factors described above or other suitable factors.

Although the foregoing contemplates that security management system 118 resides in security device 220, in some embodiments, security management system 118 may be implemented by a device external to security device 220, including without limitation a device within external network 202.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A computer-implemented method for managing network communication, comprising:
    establishing a reference outbound email volume rate for a user account;
    monitoring the user account to determine a current outbound email volume rate;
    determining a risk score based on the current outbound email volume rate and the reference outbound email volume rate;
    in response to the risk score exceeding a threshold risk score, buffering subsequent outgoing emails of the user account, wherein the buffering includes delaying delivery of the outgoing emails pending further analysis, and wherein the outgoing emails are not buffered if the risk score does not exceed the threshold risk score;
    analyzing the buffered outgoing emails against one or more factors indicative of a probability of the buffered outgoing emails comprising spam; and
    responsive to analysis of the buffered outgoing emails against the one or more factors indicating that the user account is potentially compromised, quarantining the user account and preventing outbound mail from being delivered from the user account;
    wherein the one or more factors comprises an alphabetization of destination addresses for the buffered outgoing emails, and a measure of the number of destination addresses of the buffered outgoing emails which are freemail accounts.

2. The method of claim 1, further comprising delivering the buffered outgoing emails responsive to analysis of the buffered outgoing emails against the one or more factors indicating that the user account is not potentially compromised.

3. The method of claim 1, further comprising allowing delivery of buffered outgoing emails of the user account if the risk score is less than the threshold risk score.

4. The method of claim 1, wherein the one or more factors comprises a number of unique domains to which the buffered outgoing emails are addressed.

5. The method of claim 1, wherein the one or more factors comprises a user's use of one or more email clients to send the buffered outgoing emails.

6. The method of claim 1, wherein the one or more factors comprises a length.

7. A system comprising:
a processor; and
a non-transitory, computer-readable storage medium comprising instructions executable by the processor and configured for:
establishing a reference outbound email volume rate for a user account;
monitoring the user account to determine a current outbound email volume rate;
determining a risk score based on the current outbound email volume rate and the reference outbound email volume rate;
in response to the risk score exceeding a threshold risk score, buffering subsequent outgoing emails of the user account, wherein the buffering includes delaying delivery of the outgoing emails pending further analysis, and wherein the outgoing emails are not buffered if the risk score does not exceed the threshold risk score;
analyzing the buffered outgoing emails against one or more factors indicative of a probability of the buffered outgoing emails comprising spam; and
responsive to analysis of the buffered outgoing emails against the one or more factors indicating that the user account is potentially compromised, quarantining the user account and preventing outbound mail from being delivered from the user account;
wherein the one or more factors comprises an alphabetization of destination addresses for the buffered outgoing emails, and a measure of the number of destination addresses of the buffered outgoing emails which are freemail accounts.

8. The system of claim 7, the instructions further configured for delivering the buffered outgoing emails responsive to analysis of the buffered outgoing emails against the one or more factors indicating that the user account is not potentially compromised.

9. The system of claim 7, the instructions further configured for delivery of buffered outgoing emails of the user account if the risk score is less than the threshold risk score.

10. The system of claim 7, wherein the one or more factors comprises a number of unique domains to which the buffered outgoing emails are addressed.

11. The system of claim 7, wherein the one or more factors comprises a user's use of one or more email clients to send the buffered outgoing emails.

12. The system of claim 7, wherein the one or more factors comprises a length of subject lines of the buffered outgoing emails.

13. A non-transitory, computer-readable storage medium embodying computer program code, the computer program code comprising computer executable instructions configured for:
establishing a reference outbound email volume rate for a user account;
monitoring the user account to determine a current outbound email volume rate;
determining a risk score based on the current outbound email volume rate and the reference outbound email volume rate;
in response to the risk score exceeding a threshold risk score, buffering subsequent outgoing emails of the user account, wherein the buffering includes delaying delivery of the outgoing emails pending further analysis, and wherein the outgoing emails are not buffered if the risk score does not exceed the threshold risk score;
analyzing the buffered outgoing emails against one or more factors indicative of a probability of the buffered outgoing emails comprising spam; and responsive to analysis of the buffered outgoing emails against the one or more factors indicating that the user account is potentially compromised, quarantining the user account and preventing outbound mail from being delivered from the user account;
wherein the one or more factors comprises an alphabetization of destination addresses for the buffered outgoing emails, and a measure of the number of destination addresses of the buffered outgoing emails which are freemail accounts.

14. The storage medium of claim 13, the instructions further configured for delivering the buffered outgoing emails responsive to analysis of the buffered outgoing emails against the one or more factors indicating that the user account is not potentially compromised.

15. The storage medium of claim 13, the instructions further configured for delivery of buffered outgoing emails of the user account if the risk score is less than the threshold risk score.

16. The storage medium of claim 13, wherein the one or more factors further comprises at least one of: a number of unique domains to which the buffered outgoing emails are addressed, a user's use of one or more email clients to send the buffered outgoing emails, and a length of subject lines of the buffered outgoing emails.

* * * * *